US012637249B2

(12) United States Patent
Smith

(10) Patent No.: US 12,637,249 B2
(45) Date of Patent: May 26, 2026

(54) CARTON FOR ARTICLES

(71) Applicant: Graphic Packaging International, LLC, Atlanta, GA (US)

(72) Inventor: Jeffrey D. Smith, Solon, OH (US)

(73) Assignee: Graphic Packaging International, LLC, Atlanta, GA (US)

(*) Notice: Subject to any disclaimer, the term of this patent is extended or adjusted under 35 U.S.C. 154(b) by 7 days.

(21) Appl. No.: 18/645,971

(22) Filed: Apr. 25, 2024

(65) Prior Publication Data

US 2024/0359858 A1 Oct. 31, 2024

Related U.S. Application Data

(60) Provisional application No. 63/461,999, filed on Apr. 26, 2023.

(51) Int. Cl.

| | |
|---|---|
| ***B65D 5/10*** | (2006.01) |
| ***B31B 50/73*** | (2017.01) |
| ***B31B 100/00*** | (2017.01) |

(52) U.S. Cl.

CPC .............. *B65D 5/10* (2013.01); *B31B 50/734* (2017.08); *B31B 2100/0024* (2017.08)

(58) Field of Classification Search

CPC ...... B65D 5/10; B65D 5/3621; B65D 5/0281; B65D 5/0227; B65D 5/0254; B65D 5/0263; B65D 5/3614; B65D 5/42; B65D 5/4266; B65D 5/46088; B65D 5/48014; B65D 5/48016

USPC ................................ 229/185, 117, 155, 152

See application file for complete search history.

(56) References Cited

U.S. PATENT DOCUMENTS

| | | | | |
|---|---|---|---|---|
| 2,327,709 A | | 8/1943 | Himes | |
| 2,332,250 A | | 10/1943 | O'Reilly | |
| 2,388,190 A | | 10/1945 | Smart | |
| 2,900,122 A | | 8/1959 | Steiner | |
| 3,361,326 A | | 1/1968 | Croley | |
| 3,539,093 A | * | 11/1970 | Massengill ........ | B65D 75/5888 206/820 |
| 3,592,337 A | | 7/1971 | Phillips, Jr. | |

(Continued)

FOREIGN PATENT DOCUMENTS

| | | |
|---|---|---|
| AU | 2008282386 B2 | 3/2011 |
| AU | 2021276257 A1 | 1/2023 |

(Continued)

OTHER PUBLICATIONS

International Search Report and Written Opinion for PCT/US2024/026200 dated Aug. 30, 2024.

*Primary Examiner* — Christopher R Demeree

(74) *Attorney, Agent, or Firm* — Andrew N. Claerbout; FisherBroyles, LLP

(57) ABSTRACT

A carton for holding at least one article includes a plurality of panels extending at least partially around an interior of the carton, and a plurality of end flaps foldably connected to a respective panel of the plurality of panels, the plurality of end flaps includes a plurality of bottom end flaps at least partially overlapped to form a closed bottom of the carton, at least one bottom end flap of the plurality of bottom end flaps at least partially defined by a free edge that forms a recess and a protrusion extending into the recess, the recess at least partially receiving a portion of another bottom end flap of the plurality of bottom end flaps.

26 Claims, 9 Drawing Sheets

(56) References Cited

U.S. PATENT DOCUMENTS

| | | | |
|---|---|---|---|
| 3,722,782 A | 3/1973 | Collie | |
| 4,354,630 A | 10/1982 | Roccaforte | |
| 4,487,359 A | 12/1984 | Hemmeter | |
| 4,572,424 A * | 2/1986 | Muise | B65D 5/10 229/185 |
| 5,042,714 A | 8/1991 | Hall | |
| 5,743,462 A * | 4/1998 | Stone | B65D 5/5415 229/933 |
| 6,079,616 A | 6/2000 | Chinks | |
| 7,665,653 B2 | 2/2010 | Fitzwater | |
| 7,743,972 B2 | 6/2010 | Fogle | |
| 7,841,511 B2 | 11/2010 | Fogle | |
| 8,061,585 B2 | 11/2011 | Nikolai | |
| 8,511,463 B2 | 8/2013 | Brand | |
| 8,770,469 B2 | 7/2014 | Burke | |
| 8,840,009 B2 | 9/2014 | Spivey, Sr. | |
| 8,840,011 B2 | 9/2014 | Kohler | |
| 8,967,380 B2 | 3/2015 | Moncrief | |
| 9,073,680 B2 | 7/2015 | Kastanek | |
| 9,174,763 B2 | 11/2015 | Smalley | |
| 9,511,894 B2 | 12/2016 | Wilson | |
| 9,630,736 B2 | 4/2017 | Oliveira | |
| 9,745,096 B2 | 8/2017 | Coltri-Johnson | |
| 10,173,805 B2 | 1/2019 | Waddington | |
| 10,214,315 B2 | 2/2019 | Oliveira | |
| 10,583,955 B2 | 3/2020 | Ackroyd | |
| 10,981,710 B1 | 4/2021 | Pietrini | |
| 11,524,827 B2 | 12/2022 | Gungner | |
| 12,351,372 B2 | 7/2025 | Spitler | |
| 2006/0231600 A1 | 10/2006 | Holley | |
| 2007/0199981 A1 | 8/2007 | Oliveira | |
| 2008/0269034 A1 | 10/2008 | Stier | |
| 2009/0121004 A1 | 5/2009 | Fogle | |
| 2009/0272793 A1 | 11/2009 | Ho Fung | |
| 2011/0272457 A1 | 11/2011 | Fitzwater | |
| 2011/0290692 A1 | 12/2011 | Spivey, Sr. | |
| 2015/0174847 A1 | 6/2015 | Thum | |
| 2018/0170610 A1 | 6/2018 | Buss | |
| 2019/0118995 A1 | 4/2019 | Page | |
| 2019/0337668 A1 | 11/2019 | Block | |
| 2019/0367207 A1 | 12/2019 | Gathercole | |
| 2021/0031968 A1 | 2/2021 | Valencia | |
| 2023/0286694 A1 | 9/2023 | Bevier | |
| 2023/0348129 A1 | 11/2023 | Kim | |
| 2024/0359858 A1 | 10/2024 | Smith | |
| 2025/0128851 A1 | 4/2025 | Valencia | |
| 2025/0197097 A1 | 6/2025 | Chen | |

FOREIGN PATENT DOCUMENTS

| | | | |
|---|---|---|---|
| CA | 2990462 | C | 8/2020 |
| EP | 1926665 | B1 | 11/2015 |
| JP | 3107562 | U | 2/2005 |
| KR | 10-2338001 | B1 | 12/2021 |
| WO | 2009012299 | A1 | 1/2009 |

* cited by examiner

CARTON FOR ARTICLES

CROSS-REFERENCE TO RELATED APPLICATION

The present disclosure claims the benefit of U.S. Provisional Patent Application No. 63/461,999, filed on Apr. 26, 2023.

INCORPORATION BY REFERENCE

The entire disclosure of U.S. Provisional Patent Application No. 63/461,999, filed on Apr. 26, 2023, is hereby incorporated by reference for all purposes as if set forth in its entirety.

BACKGROUND

The present disclosure generally relates to cartons for holding one or more articles.

SUMMARY

According to one aspect, the disclosure is generally directed to a carton for holding at least one article, the carton comprising a plurality of panels extending at least partially around an interior of the carton, and a plurality of end flaps foldably connected to a respective panel of the plurality of panels, the plurality of end flaps comprising a plurality of bottom end flaps at least partially overlapped to form a closed bottom of the carton, at least one bottom end flap of the plurality of bottom end flaps at least partially defined by a free edge that forms a recess and a protrusion extending into the recess, the recess at least partially receiving a portion of another bottom end flap of the plurality of bottom end flaps.

According to another aspect, the disclosure is generally directed to a blank for forming a carton for holding at least one article, the carton comprising a plurality of panels for extending at least partially around an interior of the carton formed from the blank, and a plurality of end flaps foldably connected to a respective panel of the plurality of panels, the plurality of end flaps comprising a plurality of bottom end flaps for being at least partially overlapped to form a closed bottom of the carton formed form the blank, at least one bottom end flap of the plurality of bottom end flaps at least partially defined by a free edge that forms a recess and a protrusion extending into the recess, the recess for at least partially receiving a portion of another bottom end flap of the plurality of bottom end flaps when the carton is formed from the blank.

According to another aspect, the disclosure is generally directed to a method of forming a carton for holding at least one article, the method comprising obtaining a blank comprising a plurality of panels and a plurality of end flaps foldably connected to a respective panel of the plurality of panels, the plurality of end flaps comprising a plurality of bottom end flaps, at least one bottom end flap of the plurality of bottom end flaps at least partially defined by a free edge that forms a recess and a protrusion extending into the recess. The method further comprises positioning the plurality of panels extending at least partially around an interior of the blank, at least partially overlapping the plurality of bottom end flaps to form a closed bottom of the carton, and positioning the recess of the at least one bottom end flap at least partially receiving a portion of another bottom end flap of the plurality of bottom end flaps.

According to another aspect, the disclosure is generally directed to a sheet comprising a plurality of blanks, the sheet comprising a first blank for forming a carton for holding at least one article, the first blank comprising a plurality of panels for extending at least partially around an interior of the carton formed from the first blank, and a plurality of end flaps foldably connected to a respective panel of the plurality of panels of the first blank, the plurality of end flaps comprising a plurality of bottom end flaps for being at least partially overlapped to form a closed bottom of the carton formed form the first blank, at least one bottom end flap of the plurality of bottom end flaps of the first blank at least partially defined by a free edge that forms a recess and a protrusion extending into the recess, and a second blank for forming a carton for holding at least one article. The second blank comprises a plurality of panels for extending at least partially around an interior of the carton formed from the second blank, and a plurality of end flaps foldably connected to a respective panel of the plurality of panels of the second blank, the plurality of end flaps comprising a plurality of bottom end flaps for being at least partially overlapped to form a closed bottom of the carton formed form the second blank, at least one bottom end flap of the plurality of bottom end flaps of the second blank at least partially defined by a free edge that forms a recess and a protrusion extending into the recess, the first blank and the second blank arranged such that the protrusion of the at least one bottom end flap of the second blank is at least partially received in the recess of the at least one bottom end flap of the first blank, and such that the protrusion of the at least one bottom end flap of the first blank is at least partially received in the recess of the at least one bottom end flap of the second blank.

Those skilled in the art will appreciate the above-stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

Cartons according to the present disclosure can accommodate articles of numerous different shapes. For the purpose of illustration and not for the purpose of limiting the scope of the disclosure, the following detailed description describes articles such as food products. Such food products can be provided in discrete or granular portions, e.g., as in snacks, for example, candy, gum, chocolate, granola, cereal, nuts, trail mix, raisins, fresh or dried fruit, etc. It will be understood that a different type of article such as a different type of food product can be held in cartons according to the present disclosure without departing from the disclosure. Such food products can be wrapped or otherwise individually packaged prior to receipt in cartons described herein. It will be further understood that articles other than food products can be held in cartons according to the present disclosure.

In this specification, the terms "lower," "bottom," "upper," and "top" indicate orientations determined in relation to fully erected and upright cartons. As described herein, cartons can be formed from blanks by overlapping multiple panels, portions, and/or end flaps. Such panels, portions and/or end flaps may be designated herein in terms relative to one another, e.g., "first", "second", "third", etc., in sequential or non-sequential reference, without departing from the disclosure.

Figure 1:
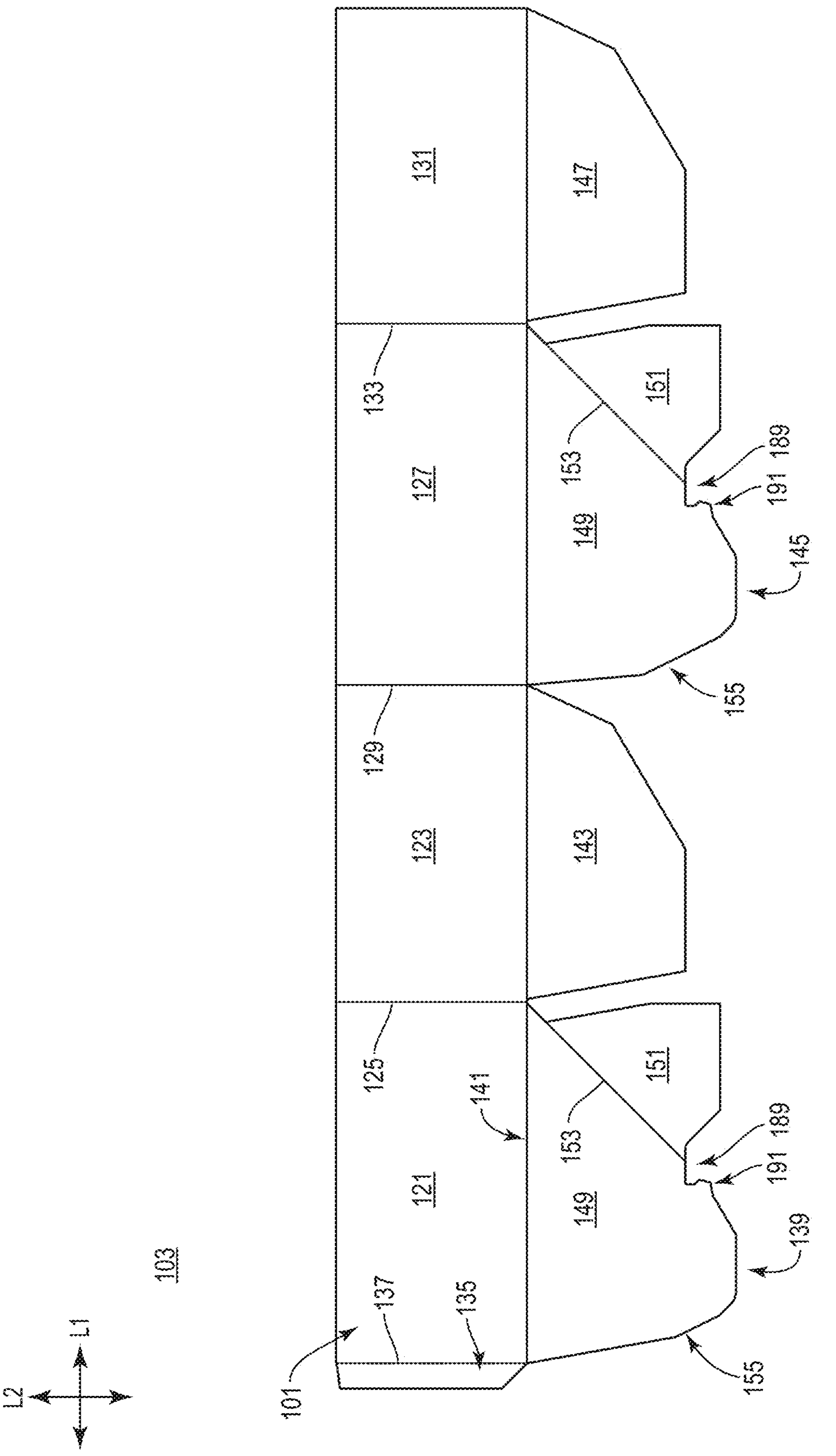
FIG. 1 is a plan view of an exterior surface of a blank used to form a carton according to a first exemplary embodiment of the disclosure.

FIG. 1 is a plan view of an exterior surface 101 of a portion of a blank, generally indicated at 103, used to form a container or carton 105 (FIG. 2) according to an exemplary embodiment of the disclosure. As described further herein, the carton 105 can be provided with bottom forming features that facilitate the quick and efficient formation of a closed bottom 111 of the carton 105.

As shown in FIG. 1, the blank 103 and carton 105 formed therefrom can have a longitudinal axis L1 and a lateral axis L2, and a plurality of panels for extending at least partially around the interior 107 of the carton 105 formed from the blank 103. In the illustrated embodiment, the plurality of panels of the carton 105/blank 103 can include a first side panel 121, a second side panel 123 foldably connected to the first side panel 121 at a lateral fold line 125, a third side panel 127 foldably connected to the second side panel 123 at a lateral fold line 129, and a fourth side panel 131 foldably connected to the third side panel 127 at a lateral fold line 133.

An attachment flap or attachment panel 135 can be foldably connected to the first side panel 121 at a lateral fold line 137.

The blank 103 and carton 105 formed therefrom can also include a plurality of end flaps foldably connected to a respective panel of the plurality of panels. As described herein, the plurality of end flaps can include a plurality of bottom end flaps that can be at least partially overlapped to form a closed bottom end 111 of the carton 105.

In some embodiments, a reclosable top end of the carton 105 can be at least partially formed by a lid or lid panel foldably connected to a respective panel of the plurality of panels.

The plurality of end flaps of the blank 103 and carton 105 formed therefrom can include a first bottom end flap 139 foldably connected to the first side panel 121 at a respective portion of a longitudinal fold line 141, a second bottom end flap 143 foldably connected to the second side panel 123 at a respective portion of the longitudinal fold line 141, a third bottom end flap 145 foldably connected to the third side panel 127 at a respective portion of the longitudinal fold line 141, and a fourth bottom end flap 147 foldably connected to the fourth side panel 131 at a respective portion of the longitudinal fold line 141.

The bottom end flaps 139, 145 can have a generally similar configuration, with a respective base portion 149 foldably connected to the respective side panels 121, 127 at the respective portion of the fold line 141, and a respective distal portion 151 foldably connected to the respective base portion 147 at a respective oblique fold line 153.

Figure 1A:
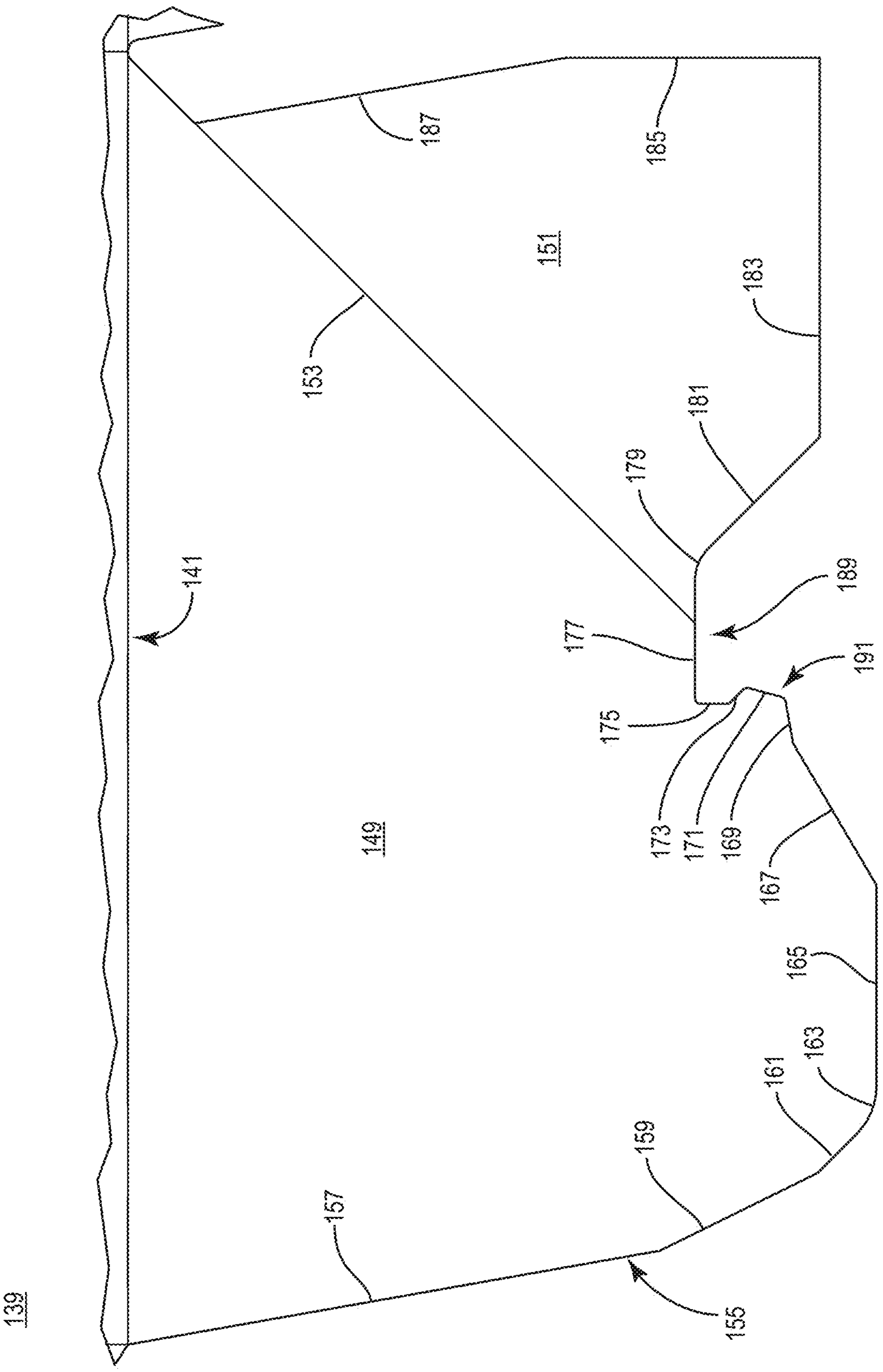
FIG. 1A is an enlarged view of a portion of the blank of FIG. 1.

As shown, with additional reference to the enlarged view of bottom end flap 139 in FIG. 1A, each bottom end flap 139, 145 can define a respective free edge 155 that includes a plurality of segments, each segment of the plurality of segments intersecting a respective adjacent segment of the plurality of segments of the free edge 155. The plurality of segments of the free edge 155 can include a respective first oblique segment 157 extending downwardly from a respective portion of the fold line 141 to a respective second oblique segment 159, the respective second oblique segment 159 having a shallower angle measured relative an axis parallel to the longitudinal axis L1 and extending to the right of FIG. 1 than the respective oblique segment 157 (e.g., such that both segments 159, 157 extend at negative angles relative to the referenced axis parallel to the axis L1).

As described herein, a respective plane can be formed along the bottom end flaps 139, 143, 145, 147 from the fold line 141 to the respective free edges 155 thereof, such that each bottom end flap 139, 143, 145, 147 has the longitudinal axis L1 and the lateral axis L2.

In some embodiments, such referenced portion of the longitudinal axis L1 can extend along the longitudinal fold line 141 from the endpoint thereof proximate the end flap 139 to the endpoint thereof proximate the end flap 147. In this regard, angular references described herein are generally described as positive when measured in a counterclockwise direction from the referenced axis parallel to the axis L1, e.g., above the respective free edges 155 and extending, from left to right, from the end flap 139 to the end flap 147, and angular references described herein are generally designated as negative when measured in a clockwise direction from such referenced axis parallel to the axis L1.

The respective oblique segment 159 can extend to a respective third oblique segment 161, the respective third oblique segment 161 having a lesser or shallower (negative) angle measured relative to the axis parallel to the longitudinal axis L1 extending to the right of FIG. 1 than the respective oblique segment 159.

A respective curved segment 163 of the free edge 155 of the respective bottom end flaps 139, 145 can extend from the respective oblique segment 161 to a respective first longitudinal segment 165 that intersects a respective fourth oblique segment 167 (broadly, "first oblique segment") that extends upwardly from the respective longitudinal segment 165 at a positive angle relative to the axis parallel to the longitudinal axis L1.

The respective oblique segment 167 can intersect a respective fifth oblique segment 169 (broadly, "second oblique segment") of the free edge 155 of the respective bottom end flaps 139, 145 that extends upwardly at a shallower angle relative to the axis parallel to the longitudinal axis L1 than the respective segment 167. The respective oblique segment 169 can intersect a respective sixth oblique segment 171 (broadly, “third oblique segment”) that extends upwardly from the respective oblique segment 169 at a greater or steeper angle relative to the axis parallel to the longitudinal axis L1 than the respective oblique segment 169.

The respective oblique segment 171 can intersect a respective seventh oblique segment 173 (broadly, “fourth oblique segment”) that extends upwardly and rearwardly from the respective segment 171 at angle relative to the axis parallel to the longitudinal axis L1.

As shown, the segment 173 of the respective free edges 155 can be a positive angle measured with respect to the axis parallel to the longitudinal axis L1, e.g., so as to have a longitudinal component extending, from right to left, in the direction from the end flap 147 to the end flap 139. In this regard, along a counterclockwise frame of reference, the segment 173 can extend relative to the referenced portion of the longitudinal axis L1 at a positive value greater than the negative angle associated with the segment 171. However, it will be understood that the absolute value of such angle associated with the segment 173 may be less than the absolute value of the angle associated with the segment 171 such that the segment 173 could be characterized as lesser or shallower than the segment 171 in some respects.

The respective oblique segment 173 can intersect a respective first lateral segment 175 of the free edge 155 of the respective bottom end flaps 139, 145 that extends to a respective second longitudinal segment 177. A respective curved segment 179 can extend from the respective segment 177 to a respective eighth oblique segment 181 that intersects a respective third longitudinal segment 183.

The respective longitudinal segment 183 can intersect a respective second lateral segment 185 that extends to a respective ninth oblique segment 187 of the free edge 155 of the respective bottom end flaps 139, 145 that intersects a respective endpoint of the respective fold line 141. As shown, the segment 187 of the respective free edges 155 can be a positive angle measured with respect to the axis parallel to the longitudinal axis L1.

In this regard, the free edge 155 of the respective bottom end flaps 139, 145 can at least partially define a recess 189 therealong and a respective protrusion 191 extending into the respective recess 189. In some embodiments, As described further herein, the configuration of the respective bottom end flaps 139, 145 can facilitate at least partial formation of the closed bottom 109 of the carton 105. In some embodiments, one or both of the protrusions 191 can be positioned between about 0.5625 inches and about 0.4375 inches from a bottom edge of the respective end flap 139, 145.

Figure 2:
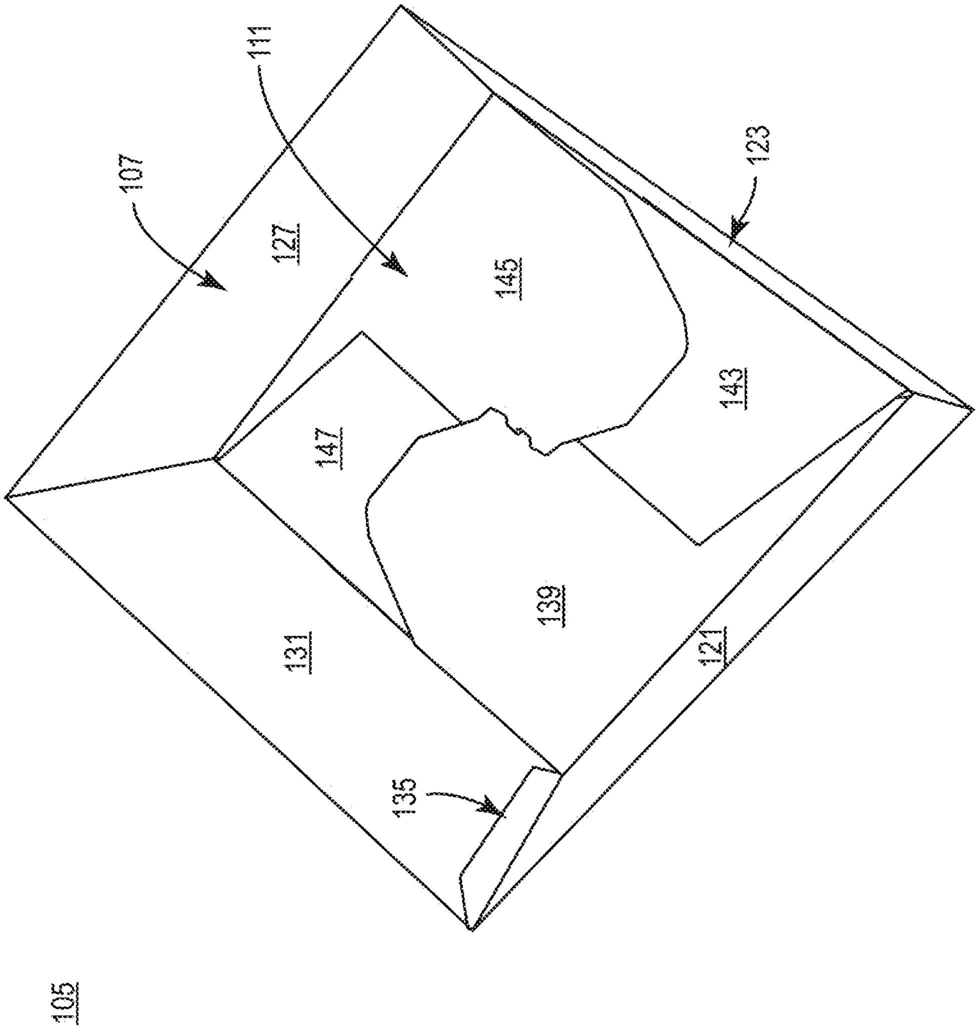
FIG. 2 is a perspective view of a carton formed from the blank of FIG. 1 according to the first exemplary embodiment of the disclosure.
Figure 3:
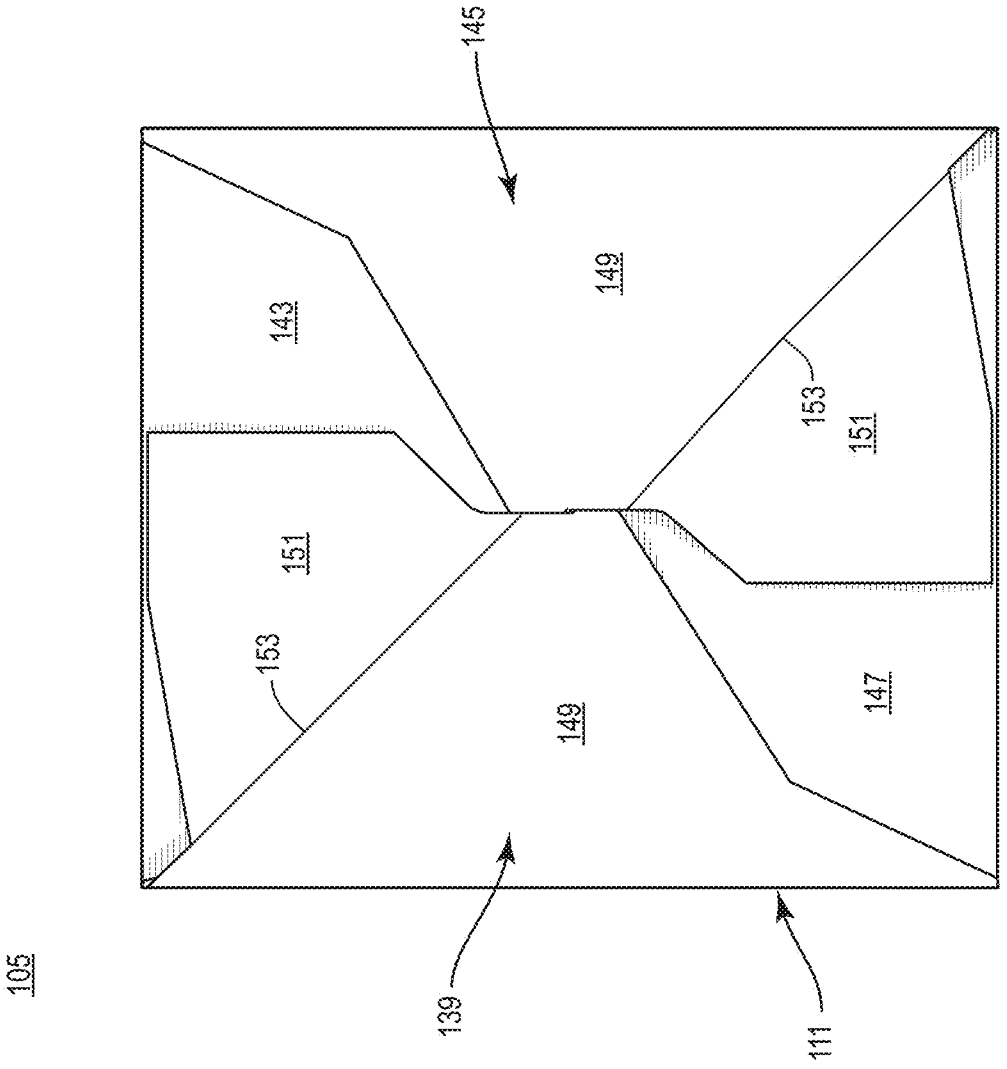
FIG. 3 is a bottom view of a carton formed from the blank of FIG. 1 according to the exemplary embodiment of the disclosure.

Referring additionally to FIG. 2, formation of the carton 105 from the blank 103 will be described according to a first exemplary embodiment of the disclosure. The blank 103 can be positioned with the exterior surface 101 thereof in contact with a supporting surface, e.g., in a face-down orientation, and with an interior surface facing upwardly. The plurality of end flaps 139, 143, 149, 147 can be folded at respective portions of the fold line 141 such that the respective interior surfaces thereof are positioned into at least partial face-to-face contact with respective interior surfaces of portions of the respective panels 121, 123, 127, 131.

Simultaneously or thereafter, the distal portions 151 of the respective end flaps 139, 145 can be folded at the respective fold line 153 into at least partial face-to-face contact with the respective base portions 149 thereof.

The interior surface of the attachment flap 135 can be folded at the fold line 137 into at least partial face-to-face contact with the interior surface of the side panel 121. Simultaneously or thereafter, the panel 127 can be folded at the fold line 129 into at least partial face-to-face contact with the side panel 123, and such that the side panel 131 is carried into at least partial face-to-face contact with respective portions of the side panel 121 and the attachment flap 135.

In such an arrangement, the interior surface of the distal portion 151 of the end flap 145 can be positioned in at least partial face-to-face contact with the interior surface of the end flap 143, and the interior surface of the distal portion 151 of the end flap 139 can be positioned in at least partial face-to-face contact with the interior surface of the end flap 147.

The aforementioned arrangement of panels and end flaps can be a collapsed configuration of the blank 103 or the carton 105 formed therefrom, for example, for shipping, storage, etc., and can be at least partially maintained with one or more applications of an adhesive such as glue. For example, in some embodiments, adhesive can be applied to the exterior surface of the attachment flap 135 to adhere the attachment flap 135 to the interior surface of the side panel 131, and adhesive can be applied to the exterior surfaces of the respective distal portions 151 of the respective end flaps 139, 145 to adhere the end flaps 139, 145 to the respective interior surfaces of the respective end flaps 143, 147.

The panels 121, 123, 127, 131 can be folded at the fold lines 125, 129, 133 at least partially around the interior 107 of the carton 105 and to position the first side panel 121 and the third side panel 127 in generally spaced and parallel relation, and to position the second side panel 123 and the fourth side panel 131 in generally spaced and parallel relation. In this regard, the first side panel 121 is positioned opposite the third side panel 127, and the second side panel 123 is positioned opposite the fourth side panel 131.

The aforementioned reconfiguration of the panels 121, 123, 127, 131 can occur, in some embodiments, by exerting a compressive force on the collapsed configuration of the blank 103/carton 105 by squeezing the blank 103/carton 105 proximate the respective fold lines 129, 137.

Such reconfiguration of the blank 103/carton 105 can cause the plurality of end flaps 139, 143, 149, 147 to fold downwardly at respective portions of the fold line 141 away from the interior 107 of the carton 105 and into a generally planar arrangement to form the closed bottom 111 of the carton 105.

Such reconfiguration of the end flaps 139, 143, 149, 147 can occur, in some embodiments, pursuant to the movement of the panels 121, 123, 127, 131 described above, obviating the need to directly manipulate the end flaps 139, 143, 149, 147. Furthermore, the bottom forming features of the blank 103 and carton 105 formed therefrom are such that the respective recesses 189 of the respective end flaps 139, 145 can be positioned to receive the respective protrusions 191 of the respective end flaps 145, 139 to provide an at least partially interfering fit that positions and/or at least partially maintains the configuration of the closed bottom 111.

Such configuration of the closed bottom 111 of the carton 105 afforded by the bottom forming features thereof can be provided with a robust construction, for example, that avoids inadvertent disengagement from the respective protrusion 191 from the respective recess 189 and subsequent movement of the closed bottom 111. Furthermore, the disclosed arrangement of the closed bottom 111 can suitably support articles of relatively increased weight in the interior 107 of the carton 105. Further still, at least the end flaps 143, 147 of the blank 103/carton 105 can be configured to receive one or more cuts therein or therealong, for example, for ventilation/drainage, product visibility, etc., without interfering the formation or maintenance of the closed bottom 105.

While the carton 105 illustrated in FIG. 2 is provided as exemplary, it will be understood that blanks and cartons formed therefrom can be provided with the disclosed arrangement of bottom end flaps 139, 143, 149, 147 to provide a resultant carton with features and advantages similar to those described herein.

In some embodiments, multiple blanks 103 can be cut from a sheet prior to formation of respective cartons therefrom. In the illustrated embodiment, a first blank 103 is provided separably connected to an identical blank, mirrored over the longitudinal axis L1 and the lateral axis L2 in an abutting relationship such that the lowermost free edges of the bottom end flaps 139, 143, 145, 147 of the first blank 103 can be positioned in abutting relation with the respective uppermost free edges of the bottom end flaps 147, 145, 143, 139, respectively.

In this regard, the blanks 103 can be separably connected along at least one cut that defines the respective free edges 155 of the respective end flaps 139, 145 therefrom, for example, to minimize waste, optimize manufacturing efficiency etc. In this regard, in some embodiments, the free edges 155 of the respective end flaps 139, 145 of the second (inverted) blank 103 can at least partially define an alternative free edge configuration of the respective end flaps 143, 147 of the blank 103, e.g., so as to be complementary to the free edges 155 of the blank 103.

Figure 4:
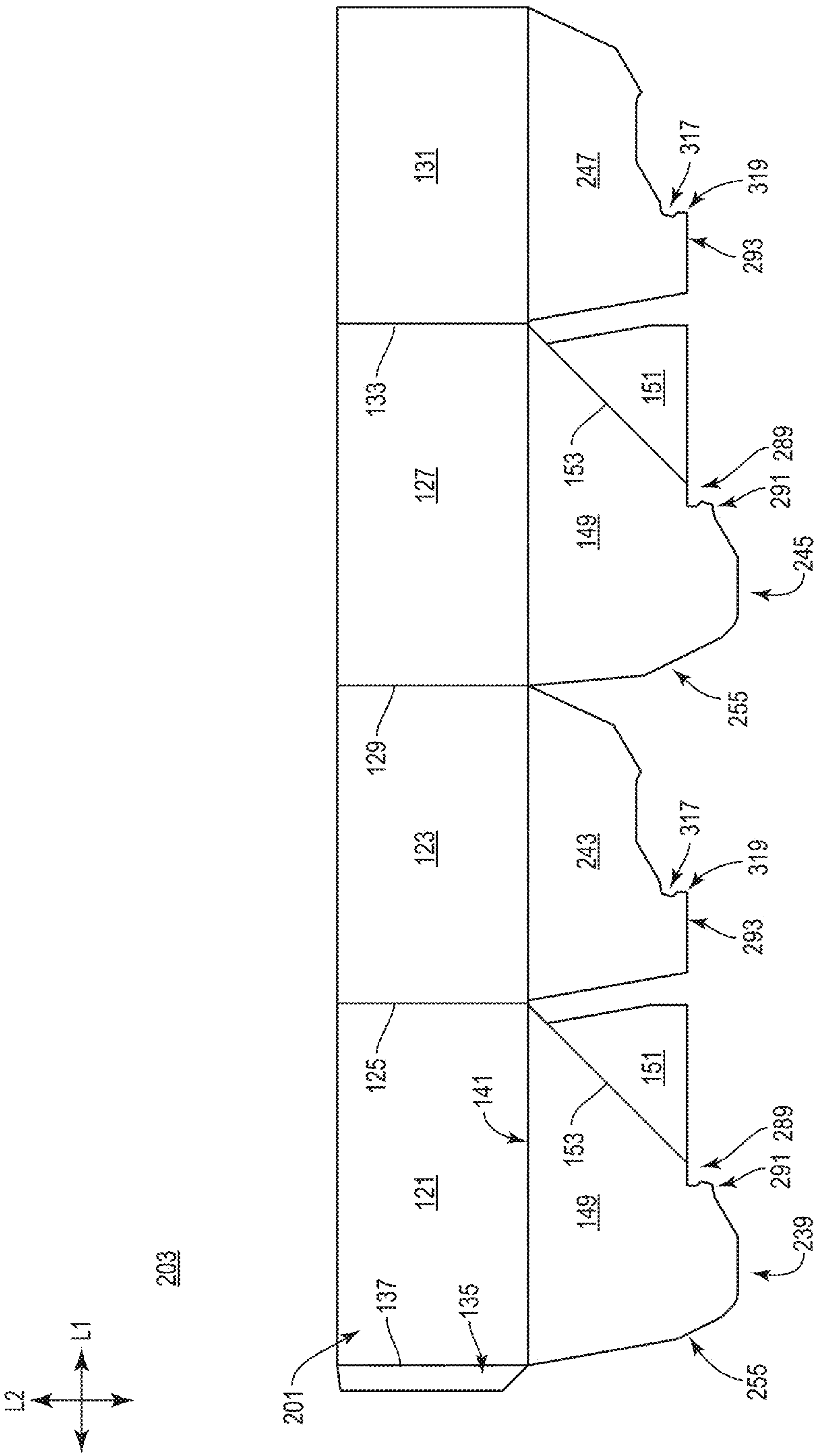
FIG. 4 is a plan view of an exterior surface of a blank used to form a carton according to a second exemplary embodiment of the disclosure.

FIG. 4 is a plan view of an exterior surface 201 of a portion of a blank, generally indicated at 203, used to form a container or carton 205 (FIG. 5) according to a second exemplary embodiment of the disclosure. As described further herein, the carton 205 can be provided with bottom forming features that facilitate the quick and efficient formation of a closed bottom 211 of the carton 205.

The blank 203 and carton 205 formed therefrom can have one or more features that are the same or similar to those described above with respect to the blank 103 and carton 105 formed therefrom, and like or similar features are designated with like or similar reference numerals.

As shown in FIG. 4, the blank 203 and carton 205 formed therefrom can have the longitudinal axis L1 and a lateral axis L2, and a plurality of panels for extending at least partially around the interior 207 of the carton 205 formed from the blank 203. In the illustrated embodiment, the plurality of panels of the carton 105/blank 103 can include the first side panel 121, the second side panel 123, the third side panel 127, the fourth side panel 131, and associated features.

The attachment flap or attachment panel 135 can be foldably connected to the first side panel 121 at the lateral fold line 137.

The blank 103 and carton 105 formed therefrom can also include a plurality of end flaps foldably connected to a respective panel of the plurality of panels. As described herein, the plurality of end flaps can include a plurality of bottom end flaps that can be at least partially overlapped to form a closed bottom end 211 of the carton 205.

In some embodiments, a reclosable top end of the carton 205 can be at least partially formed by a lid or lid panel foldably connected to a respective panel of the plurality of panels.

The plurality of end flaps of the blank 203 and carton 205 formed therefrom can include a first bottom end flap 239 (broadly, "second bottom end flap") foldably connected to the first side panel 121 at a respective portion of the longitudinal fold line 141, a second bottom end flap 243 (broadly, "first bottom end flap") foldably connected to the second side panel 123 at a respective portion of the longitudinal fold line 141, a third bottom end flap 245 (broadly, "first bottom end flap" or "second bottom end flap") foldably connected to the third side panel 127 at a respective portion of the longitudinal fold line 141, and a fourth bottom end flap 247 (broadly, "first bottom end flap" or "second bottom end flap") foldably connected to the fourth side panel 131 at a respective portion of the longitudinal fold line 141.

The bottom end flaps 239, 243, 245, 247 can be generally similar to the bottom end flaps 139, 143, 145, 147 described above, e.g., such that the end flaps 239, 245 can have the base portion 149, distal portion 151, and associated features. Furthermore, the end flaps 239, 245 can have a generally similar configuration and the end flaps 243, 247 can have a generally similar configuration.

Figure 4A:
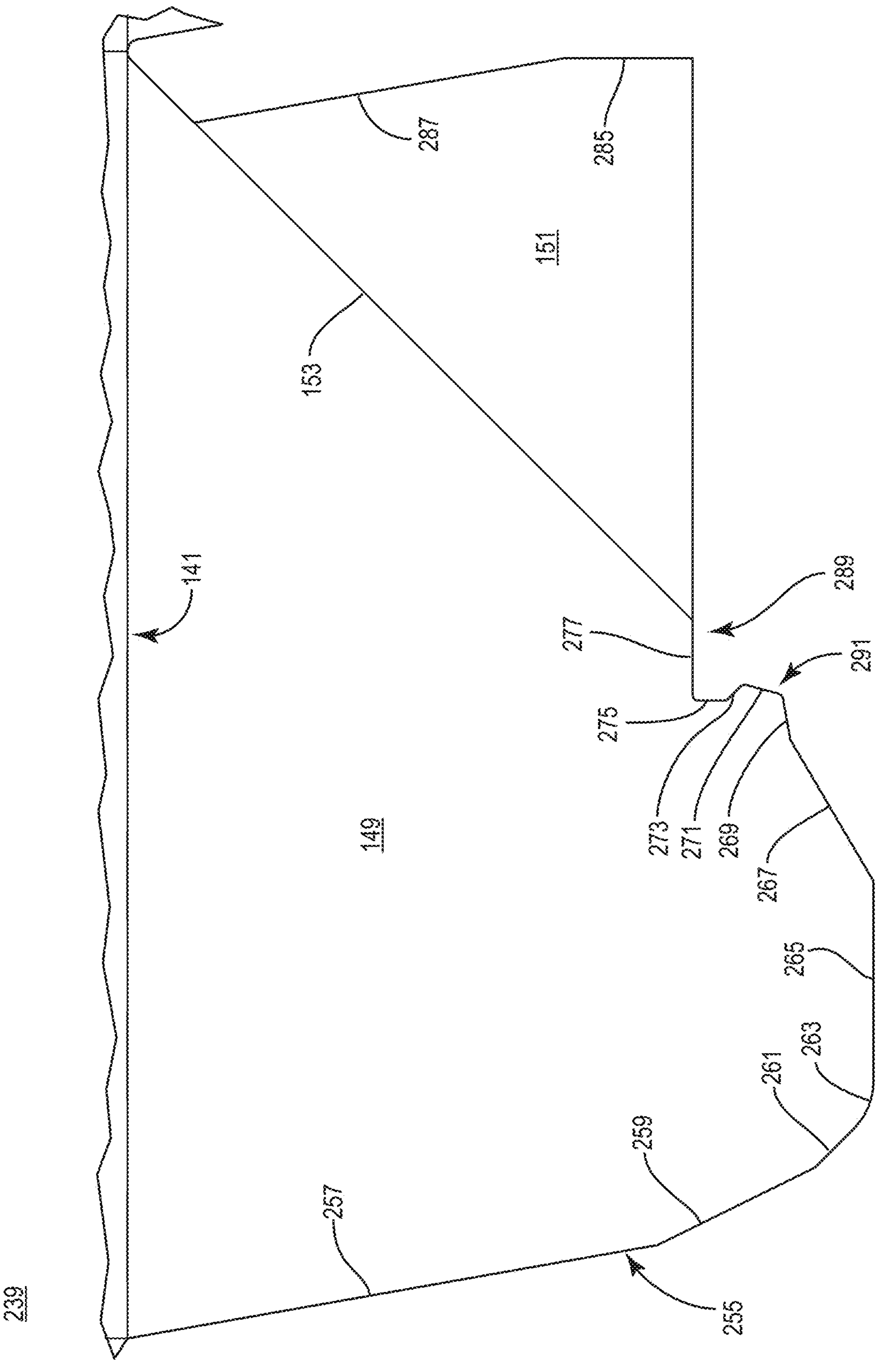
FIG. 4A is an enlarged view of a portion of the blank of FIG. 4.

However, and with additional reference to the enlarged views of FIG. 4A, the end flaps 249, 245 can have a respective free edge 255 that includes a plurality of segments, each segment of the plurality of segments intersecting a respective adjacent segment of the plurality of segments of the free edge 255. The plurality of segments of the free edge 255 can include that includes a respective first oblique segment 257 extending downwardly from a respective portion of the fold line 141 to a respective second oblique segment 259, the respective second oblique segment 259 having a shallower angle than the respective oblique segment 257 (e.g., such that both segments 259, 257 extend at negative angles relative to the axis parallel to the longitudinal axis L1 as described above with respect to the blank 103/carton 105).

As described herein, a respective plane can be formed along the bottom end flaps 239, 243, 245, 247 from the fold line 141 to the respective free edges 255, 293 thereof, such that each bottom end flap 239, 243, 245, 247 has the longitudinal axis L1 and the lateral axis L2.

The respective oblique segment 259 can extend to a respective third oblique segment 261, the respective third oblique segment 261 having a lesser or shallower (negative) angle measured relative to a portion of the longitudinal axis L1 extending to the right of FIG. 4 than the respective oblique segment 259.

A respective curved segment 263 of the free edge 255 of the respective bottom end flaps 239, 245 can extend from the respective oblique segment 261 to a respective first longitudinal segment 265 that intersects a respective fourth oblique segment 267 (broadly, "first oblique segment") that extends upwardly from the respective longitudinal segment 265 at a positive angle relative to the axis parallel to the longitudinal axis L1.

The respective oblique segment 267 can intersect a respective fifth oblique segment 269 (broadly, "second oblique segment") of the free edge 255 of the respective bottom end flaps 239, 245 that extends upwardly at a shallower angle relative to the axis parallel to the longitudinal axis L1 than the respective segment 267. The respective oblique segment 269 can intersect a respective sixth oblique segment 271 (broadly, "third oblique segment") that extends upwardly from the respective oblique segment 269 at a greater or steeper angle relative to the axis parallel to the longitudinal axis L1 than the respective oblique segment 269.

The respective oblique segment 271 can intersect a respective seventh oblique segment 273 (broadly, "fourth oblique segment") that extends upwardly and rearwardly from the respective segment 271 at angle relative to the axis parallel to the longitudinal axis L1.

As shown, the segment 273 of the respective free edges 255 can be a positive angle measured with respect to the axis parallel to the longitudinal axis L1, e.g., so as to have a longitudinal component extending, from right to left, in the direction from the end flap 247 to the end flap 239. In this regard, along a counterclockwise frame of reference, the segment 273 can extend relative to the axis parallel to the longitudinal axis L1 at a positive value greater than the negative angle associated with the segment 271. However, it will be understood that the absolute value of such angle associated with the segment 273 may be less than the absolute value of the angle associated with the segment 271 such that the segment 273 could be characterized as lesser or shallower than the segment 271 in some respects.

The respective oblique segment 273 can intersect a respective first lateral segment 275 of the free edge 255 of the respective bottom end flaps 239, 245 that extends to a respective second longitudinal segment 277.

The respective longitudinal segment 277 can intersect a respective second lateral segment 285 that extends to a respective eighth oblique segment 287 of the free edge 255 of the respective bottom end flaps 239, 245 that intersects a respective endpoint of the respective fold line 141. As shown, the segment 287 of the respective free edges 255 can be a positive angle measured with respect to the referenced portion of the longitudinal axis L1.

In this regard, the free edge 255 of the respective bottom end flaps 239, 245 can at least partially define a recess 289 therealong and a respective protrusion 291 extending into the respective recess 289. As described further herein, the configuration of the respective bottom end flaps 239, 245 can facilitate at least partial formation of the closed bottom 209 of the carton 205.

Figure 4B:
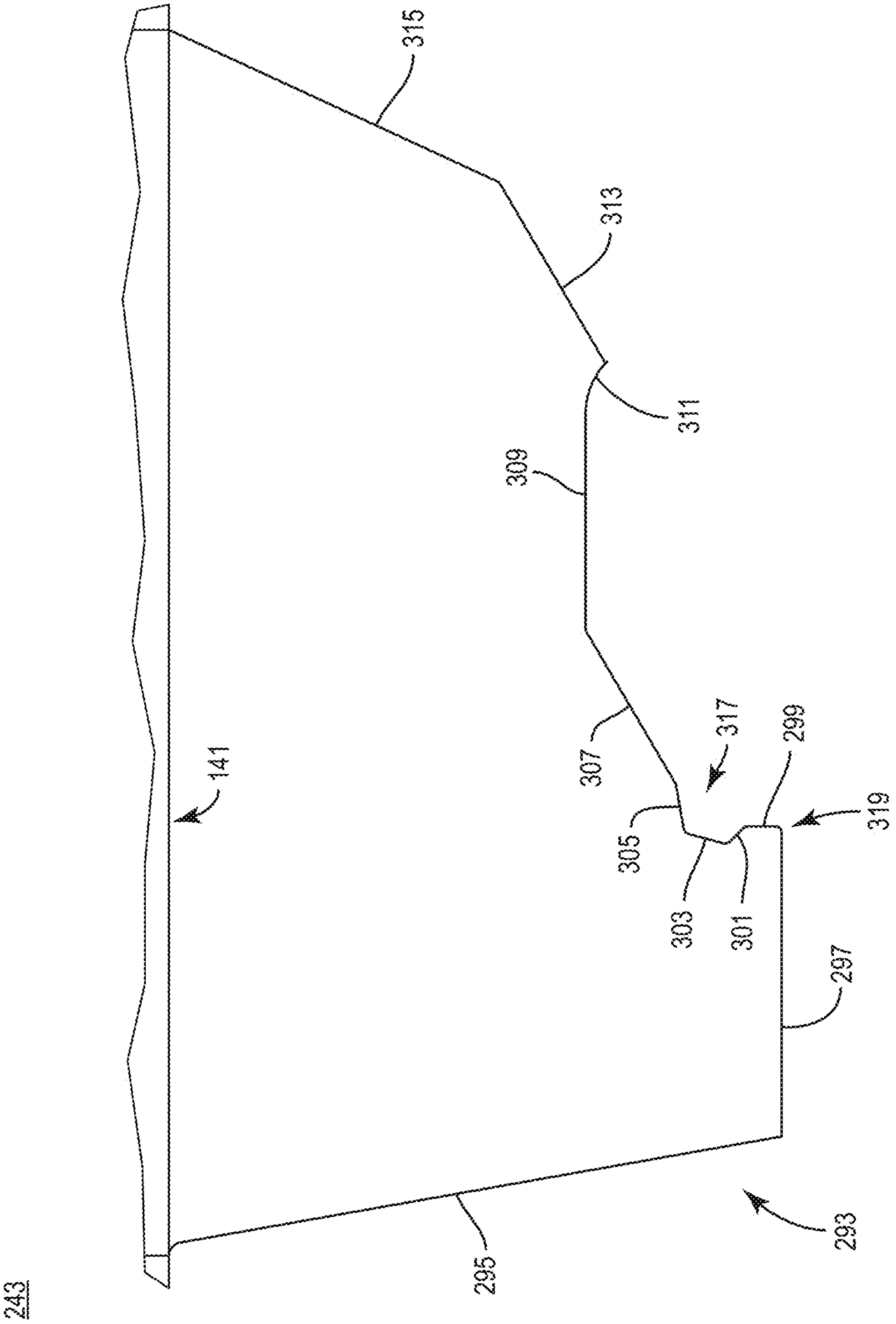
FIG. 4B is an enlarged view of another portion of the blank of FIG. 4.

Turning to the enlarged view of FIG. 4B, the end flaps 243, 247 can have a respective free edge 293 that includes a plurality of segments, each segment of the plurality of segments intersecting a respective adjacent segment of the plurality of segments of the free edge 293. The plurality of segments of the free edge 293 can include that includes a respective first oblique segment 295 extending downwardly from a respective portion of the fold line 141 to a respective first longitudinal segment 297.

The respective longitudinal segment 297 can intersect a respective lateral segment 299 that extends upwardly to intersect a respective second oblique segment 301 (broadly, "first oblique segment") that extends upwardly and rearwardly from the respective segment 299 at angle relative to the axis parallel to the longitudinal axis L1.

As shown, the segment 301 of the respective free edges 293 can be a positive angle measured with respect to the axis parallel to the longitudinal axis L1, e.g., so as to have a longitudinal component extending, from right to left, in the direction from the end flap 247 to the end flap 239. In this regard, along a counterclockwise frame of reference, the segment 301 can extend relative to the axis parallel to the longitudinal axis L1 at a positive value.

The respective segment 301 can intersect a respective third oblique segment 303 (broadly, "second oblique segment") that extends upwardly and forwardly from the respective segment 301 to a respective fourth oblique segment 305 (broadly, "third oblique segment") that extends upwardly and forwardly from the respective segment 303 (e.g., at a positive angle measured relative to the axis parallel to the longitudinal axis L1) at an angle smaller than that of the respective segment 303.

The respective segment 305 of the respective free edges 293 can intersect a respective fifth oblique segment 307 (broadly, "fourth oblique segment") that extends upwardly and forwardly at a positive angle measured relative to the axis parallel to the longitudinal axis L1 that is greater than that of the oblique segment 305. Each oblique segment 305 can intersect a respective second longitudinal segment 309 that extends to a respective downwardly curved segment 311.

Each curved segment 311 can intersect a respective sixth oblique segment 313 that extends forwardly and upwardly (e.g., at a positive angle measured relative to the axis parallel to the longitudinal axis L1) to a respective sixth oblique segment 315 that extends forwardly and upwardly to the fold line 141 at an angle relative to the axis parallel to the longitudinal axis L1 that is greater or steeper than that of the respective sixth oblique segment 313 (broadly, "fifth oblique segment").

In this regard, the free edge 293 of the respective bottom end flaps 243, 247 can at least partially define a recess 317 therealong proximate the segment 303. It will be understood that the recess 317 can be at least partially defined by one or more of the segments 297, 299, 303, 303, 3055, 307, 309, 311.

As also shown, the free edge 293 of the respective bottom end flaps 243, 247 can at least partially define a protrusion 319 proximate the segment 299 and extending into the respective recess 317. It will be understood that the recess 317 can be at least partially defined by one or more of the segments 297, 299, 303, 303, 3055, 307, 309, 311. As described further herein, the configuration of the respective bottom end flaps 243, 247 can facilitate at least partial formation of the closed bottom 209 of the carton 205.

Figure 5:
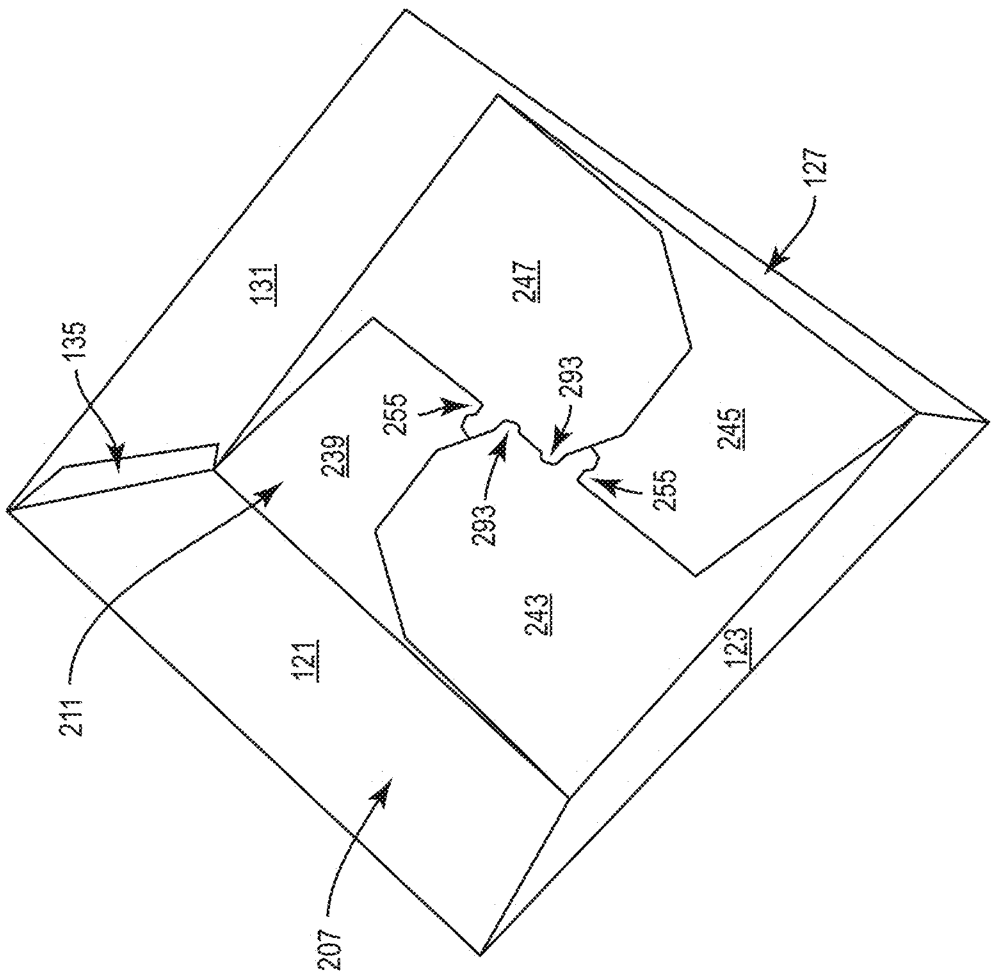
FIG. 5 is a perspective view of a carton formed from the blank of FIG. 4 according to the second exemplary embodiment of the disclosure.

Referring additionally to FIG. 5, formation of the carton 205 from the blank 203 will be described according to an exemplary embodiment of the disclosure. The panels and end flaps of the blank 203 can be folded in a manner generally similar to that described above with respect to the blank 103 and carton 105 formed therefrom.

In order to form the closed bottom 211 of the carton 205, the plurality of end flaps 239, 243, 249, 247 can fold downwardly at respective portions of the fold line 141 away from the interior 207 of the carton 205 and into a generally planar arrangement to form the closed bottom 211 of the carton 200.

As described above, such reconfiguration of the end flaps 239, 243, 249, 247 can occur, in some embodiments, pursuant to the movement of the panels 121, 123, 127, 131 described above, obviating the need to directly manipulate the end flaps 139, 143, 149, 147. Furthermore, the bottom forming features of the blank 203 and carton 205 formed therefrom are such that the respective recesses 289 of the respective end flaps 239, 245 can be positioned to receive the respective protrusions 291 of the respective end flaps 245, 239 to provide an at least partially interfering fit that positions and/or at least partially maintains the configuration of the closed bottom 211.

Such configuration of the closed bottom 211 of the carton 205 afforded by the bottom forming features thereof can be provided with a robust construction, for example, that avoids inadvertent disengagement from the respective protrusion 291 from the respective recess 289 and subsequent movement of the closed bottom 111. Furthermore, the disclosed arrangement of the closed bottom 211 can suitably support articles of relatively increased weight in the interior 207 of the carton 205. Further still, at least the end flaps 243, 247 of the blank 203/carton 205 can be configured to receive one or more cuts therein or therealong, for example, for ventilation/drainage, product visibility, etc., without interfering the formation or maintenance of the closed bottom 205.

Figure 6:
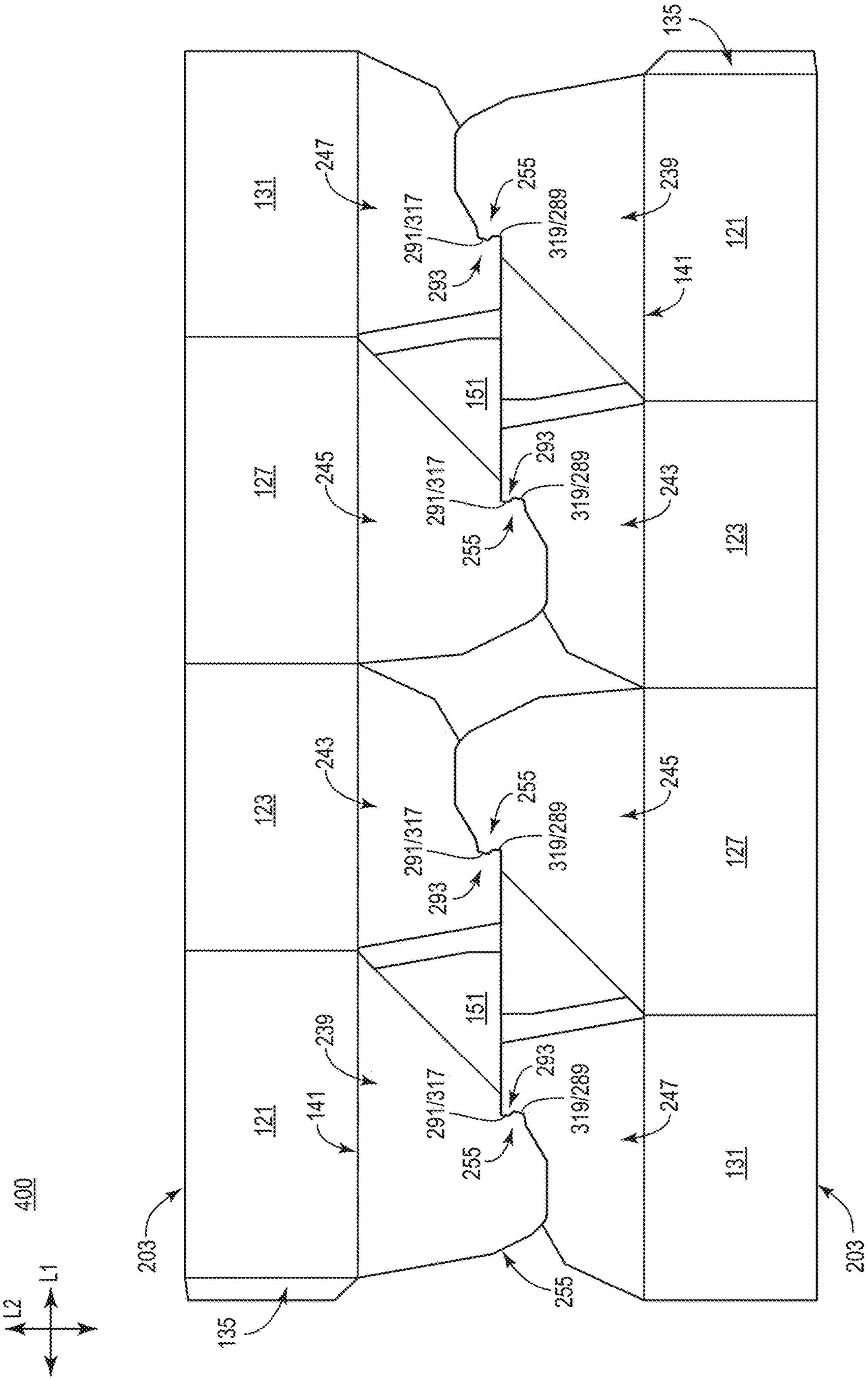
FIG. 6 is a plan view of a sheet including multiple nested blanks of FIG. 4.

With additional reference to FIG. 6, in some embodiments, multiple blanks 203 can be cut from a sheet 400 prior to formation of respective cartons therefrom. In the illustrated embodiment, a first blank 203 is provided separably connected to an identical blank 203, mirrored over the longitudinal axis L1 and the lateral axis L2 in an abutting relationship such that the respective lowermost free edges 255, 293 of the respective bottom end flaps 239, 243, 245, 247 of the first blank 203 can be positioned in abutting relation with the respective uppermost free edges of the bottom end flaps 247, 245, 243, 239, of the second blank 203, respectively.

In this regard, the free edge 255 of the bottom end flap 239 of the first blank 203 can be at least partially separable form the free edge 293 of the bottom end flap 247 of the second blank 203 at a respective cut. Similarly, the free edge 293 of the bottom end flap 243 of the first blank 203 can be at least partially separable from the free edge 255 of the bottom end flap 245 of the second blank 203 at a respective cut. The free edge 255 of the bottom end flap 245 of the first blank 203 can be at least partially separable from the free edge 293 of the bottom end flap 243 of the second blank 203. The free edge 293 of the bottom end flap 247 of the first blank 203 can be at least partially separable form the free edge 255 of the bottom end flap 239 of the second blank 203 at a respective cut.

In some embodiments, the respective free edges 255, 293 of the respective bottom end flaps of the respective first blank 203 and second blank 203 can be at least partially defined by respective cuts formed therebetween.

In some embodiments, the recesses 289 at least partially defined by the respective free edges 255 of the respective bottom end flaps 239, 245 of the first blank 203 can at least partially receive, e.g., in a generally nested relationship, the protrusions 319 at least partially defined by the free edges 293 of the respective bottom end flaps 247, 243 of the second blank 203. Further, the recesses 317 at least partially defined by the respective free edges 293 of the respective bottom end flaps 243, 247 of the first blank 203 can at least partially receive the protrusions 291 at least partially defined by the free edges 255 of the respective bottom end flaps 245, 239 of the second blank 203.

Similarly, the recesses 317 at least partially defined by the respective free edges 293 of the respective bottom end flaps 247, 243 of the second blank 203 can at least partially receive the protrusions 291 at least partially defined by the free edges 255 of the respective bottom end flaps 239, 245 of the first blank 203. Further, the recesses 289 at least partially defined by the respective free edges 255 of the respective bottom end flaps 245, 239 of the second blank 203 can at least partially receive, e.g., in a generally nested relationship, the protrusions 319 at least partially defined by the free edges 293 of the respective bottom end flaps 243, 247 of the first blank 203.

In some embodiments, such nesting arrangement of the blanks 203 in the sheet 400 can include: at least partial abutting relation of one or more of the segments 261, 263, 265, 267, 269, 271, 273, 275, 277 of the free edge 255 of the bottom end flap 239 of the first blank 203 with one or more of the respective segments 311, 209, 207, 205, 303, 301, 299, 297 of the free edge 293 of the bottom end flap 247 of the second blank 203; at least partial abutting relation of one of more of the segments 297, 299, 301, 303, 305, 307, 309, 311 of the bottom end flap 243 of the first blank 203 with one or more of the respective segments 277, 275, 273, 271, 269, 267, 265, 263 of the free edge 255 of the bottom end flap 245 of the second blank 203; at least partial abutting relation of one or more of the segments 261, 263, 265, 267, 269, 271, 273, 275, 277 of the free edge 255 of the bottom end flap 245 of the first blank 203 with one or more of the respective segments 311, 209, 207, 205, 303, 301, 299, 297 of the free edge 293 of the bottom end flap 243 of the second blank 203; and at least partial abutting relation of one of more of the segments 297, 299, 301, 303, 305, 307, 309, 311 of the bottom end flap 247 of the first blank 203 with one or more of the respective segments 277, 275, 273, 271, 269, 267, 265, 263 of the free edge 255 of the bottom end flap 239 of the second blank 203.

In this regard, the blanks 203 can be separably connected along at least one cut that defines the respective free edges 255, 293 of the respective end flaps 239, 243, 245, 247 therefrom, for example, to minimize waste, optimize manufacturing efficiency etc. In some embodiments, such arrangement of a sheet 400 can realize significant savings of paperboard material that forms the blanks 203. In some examples, such an arrangement can provide upwards of one inch of material, e.g., about 1.375 inches of material, along the sheet in the lateral direction L2, compared, for example, to otherwise-configured sheets.

The blanks according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blanks. In accordance with the above-described embodiments, the blank may be constructed of paperboard of a caliper such that it is heavier and more rigid than ordinary paper. The blanks can also be constructed of other materials, such as cardboard, hard paper, or any other material having properties suitable for enabling the cartons, to function at least generally as described above. The blanks can also be laminated to or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the spaced apart slits to be replaced with a continuous slit, a continuous score, or the like. For example, a cut line can be a continuous slit or could be wider than a slit without departing from the present disclosure. Also, a tear line can be a series of cut scores passing completely, or partially, through the material, that are separated by nicks.

The term "glue" is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton for holding at least one article, the carton comprising:

a plurality of panels extending at least partially around an interior of the carton; and a plurality of end flaps foldably connected to a respective panel of the plurality of panels, the plurality of end flaps comprising a plurality of bottom end flaps at least partially overlapped to form a closed bottom of the carton, at least one bottom end flap of the plurality of bottom end flaps at least partially defined by a free edge that forms a recess and a protrusion extending into the recess, the recess at least partially receiving a portion of another bottom end flap of the plurality of bottom end flaps, the free edge of the at least one bottom end flap comprises a plurality of segments, each segment of the plurality of segments intersecting a respective adjacent segment of the plurality of segments, the at least one bottom end flap is foldably connected to a respective panel of the plurality of panels at a fold line, a plane having a longitudinal axis and a lateral axis is defined along the at least one bottom end flap from the fold line to the free edge thereof, and the plurality of segments comprises a first longitudinal segment that intersects a first oblique segment, the first oblique segment extends to intersect a second oblique segment, the second oblique segment intersecting a third oblique segment, the third oblique segment intersecting a fourth oblique segment, the fourth oblique segment intersecting a lateral segment that extends to intersect a second longitudinal segment, the at least one bottom end flap is a first bottom end flap foldably connected to a respective panel of the plurality of panels at a respective portion of the fold line, the plurality of end flaps further comprises a second bottom end flap foldably connected to a respective panel of the plurality of panels at a respective portion of the fold line, the second bottom end flap has the longitudinal axis and the lateral axis, the second bottom end flap is at least partially defined by a free edge that forms a recess and a protrusion extending into the recess of the second bottom end flap, the free edge of the second bottom end flap comprises a plurality of segments, each segment of the plurality of segments of the second bottom end flap intersecting a respective adjacent segment of the plurality of segments of the second bottom end flap, the plurality of segments of the second bottom end flap comprises a first longitudinal segment that intersects a lateral segment that extends to intersect a first oblique segment, a second oblique segment that extends from the first oblique segment to intersect a third oblique segment, and a fourth oblique segment that extends from the third oblique segment to intersect a second longitudinal segment, the free edge of the second bottom end flap further comprises a curved segment extending from the second longitudinal segment to a fifth oblique segment.

2. The carton of claim 1, wherein the recess of the first bottom end flap is defined proximate the lateral segment of the free edge of the first bottom end flap.

3. The carton of claim 2, wherein the protrusion of the first bottom end flap is defined proximate the third oblique segment of the free edge of the first bottom end flap.

4. The carton of claim 1, wherein the recess of the second bottom end flap is defined proximate the second oblique segment of the free edge of the second bottom end flap.

5. The carton of claim 4, wherein the protrusion of the second bottom end flap is defined proximate the lateral segment of the free edge of the second bottom end flap.

6. A blank for forming a carton for holding at least one article, the blank comprising:

a plurality of panels for extending at least partially around an interior of the carton formed from the blank; and a plurality of end flaps foldably connected to a respective panel of the plurality of panels, the plurality of end flaps comprising a plurality of bottom end flaps for being at least partially overlapped to form a closed bottom of the carton formed form the blank, at least one bottom end flap of the plurality of bottom end flaps at least partially defined by a free edge that forms a recess and a protrusion extending into the recess, the recess for at least partially receiving a portion of another bottom end flap of the plurality of bottom end flaps when the carton is formed from the blank, the free edge of the at least one bottom end flap comprises a plurality of segments, each segment of the plurality of segments intersecting a respective adjacent segment of the plurality of segments, the at least one bottom end flap is foldably connected to a respective panel of the plurality of panels at a fold line, a plane having a longitudinal axis and a lateral axis is defined along the at least one bottom end flap from the fold line to the free edge thereof, and the plurality of segments comprises a first longitudinal segment that intersects a first oblique segment, the first oblique segment extends to intersect a second oblique segment, the second oblique segment intersecting a third oblique segment, the third oblique segment intersecting a fourth oblique segment, the fourth oblique segment intersecting a lateral segment that extends to intersect a second longitudinal segment, the at least one bottom end flap is a first bottom end flap foldably connected to a respective panel of the plurality of panels at a respective portion of the fold line, the plurality of end flaps further comprises a second bottom end flap foldably connected to a respective panel of the plurality of panels at a respective portion of the fold line, the second bottom end flap has the longitudinal axis and the lateral axis, the second bottom end flap is at least partially defined by a free edge that forms a recess and a protrusion extending into the recess of the second bottom end flap, the free edge of the second bottom end flap comprises a plurality of segments, each segment of the plurality of segments of the second bottom end flap intersecting a respective adjacent segment of the plurality of segments of the second bottom end flap, the plurality of segments of the second bottom end flap comprises a first longitudinal segment that intersects a lateral segment that extends to intersect a first oblique segment, a second oblique segment that extends from the first oblique segment to intersect a third oblique segment, and a fourth oblique segment that extends from the third oblique segment to intersect a second longitudinal segment, the free edge of the second bottom end flap further comprises a curved segment extending from the second longitudinal segment to a fifth oblique segment.

7. The blank of claim 6, wherein the recess of the first bottom end flap is defined proximate the lateral segment of the free edge of the first bottom end flap.

8. The blank of claim 7, wherein the protrusion of the first bottom end flap is defined proximate the third oblique segment of the free edge of the first bottom end flap.

9. The blank of claim 6, wherein the recess of the second bottom end flap is defined proximate the second oblique segment of the free edge of the second bottom end flap.

10. The blank of claim 9, wherein the protrusion of the second bottom end flap is defined proximate the lateral segment of the free edge of the second bottom end flap.

11. A method of forming a carton for holding at least one article, the method comprising:

obtaining a blank comprising a plurality of panels and a plurality of end flaps foldably connected to a respective panel of the plurality of panels, the plurality of end flaps comprising a plurality of bottom end flaps, at least one bottom end flap of the plurality of bottom end flaps at least partially defined by a free edge that forms a recess and a protrusion extending into the recess;

positioning the plurality of panels extending at least partially around an interior of the blank;

at least partially overlapping the plurality of bottom end flaps to form a closed bottom of the carton; and positioning the recess of the at least one bottom end flap at least partially receiving a portion of another bottom end flap of the plurality of bottom end flaps, the free edge of the at least one bottom end flap comprises a plurality of segments, each segment of the plurality of segments intersecting a respective adjacent segment of the plurality of segments, the at least one bottom end flap is foldably connected to a respective panel of the plurality of panels at a fold line, a plane having a longitudinal axis and a lateral axis is defined along the at least one bottom end flap from the fold line to the free edge thereof, and the plurality of segments comprises a first longitudinal segment that intersects a first oblique segment, the first oblique segment extends to intersect a second oblique segment, the second oblique segment intersecting a third oblique segment, the third oblique segment intersecting a fourth oblique segment, the fourth oblique segment intersecting a lateral segment that extends to intersect a second longitudinal segment, the at least one bottom end flap is a first bottom end flap foldably connected to a respective panel of the plurality of panels at a respective portion of the fold line, the plurality of end flaps further comprises a second bottom end flap foldably connected to a respective panel of the plurality of panels at a respective portion of the fold line, the second bottom end flap has the longitudinal axis and the lateral axis, the second bottom end flap is at least partially defined by a free edge that forms a recess and a protrusion extending into the recess of the second bottom end flap, the free edge of the second bottom end flap comprises a plurality of segments, each segment of the plurality of segments of the second bottom end flap intersecting a respective adjacent segment of the plurality of segments of the second bottom end flap, the plurality of segments of the second bottom end flap comprises a first longitudinal segment that intersects a lateral segment that extends to intersect a first oblique segment, a second oblique segment that extends from the first oblique segment to intersect a third oblique segment, and a fourth oblique segment that extends from the third oblique segment to intersect a second longitudinal segment, the free edge of the second bottom end flap further comprises a curved segment extending from the second longitudinal segment to a fifth oblique segment.

12. The method of claim 11, wherein the recess of the first bottom end flap is defined proximate the lateral segment of the free edge of first bottom end flap.

13. The method of claim 12, wherein the protrusion of the first bottom end flap is defined proximate the third oblique segment of the free edge of the first bottom end flap.

14. The method of claim 11, wherein the recess of the second bottom end flap is defined proximate the second oblique segment of the free edge of the second bottom end flap.

15. The method of claim 14, wherein the protrusion of the second bottom end flap is defined proximate the lateral segment of the free edge of the second bottom end flap.

16. A sheet comprising a plurality of blanks, the sheet comprising:

a first blank for forming a carton for holding at least one article, the first blank comprising:

a plurality of panels for extending at least partially around an interior of the carton formed from the first blank; and a plurality of end flaps foldably connected to a respective panel of the plurality of panels of the first blank, the plurality of end flaps comprising a plurality of bottom end flaps for being at least partially overlapped to form a closed bottom of the carton formed form the first blank, at least one bottom end flap of the plurality of bottom end flaps of the first blank at least partially defined by a free edge that forms a recess and a protrusion extending into the recess; and a second blank for forming a carton for holding at least one article, the second blank comprising:

a plurality of panels for extending at least partially around an interior of the carton formed from the second blank; and a plurality of end flaps foldably connected to a respective panel of the plurality of panels of the second blank, the plurality of end flaps comprising a plurality of bottom end flaps for being at least partially overlapped to form a closed bottom of the carton formed form the second blank, at least one bottom end flap of the plurality of bottom end flaps of the second blank at least partially defined by a free edge that forms a recess and a protrusion extending into the recess, the first blank and the second blank arranged such that the protrusion of the at least one bottom end flap of the second blank is at least partially received in the recess of the at least one bottom end flap of the first blank, and such that the protrusion of the at least one bottom end flap of the first blank is at least partially received in the recess of the at least one bottom end flap of the second blank.

17. The sheet of claim 16, wherein the free edge of the at least one bottom end flap of the first blank comprises a plurality of segments, each segment of the plurality of segments intersecting a respective adjacent segment of the plurality of segments.

18. The sheet of claim 17, wherein the at least one bottom end flap of the first blank is foldably connected to a respective panel of the plurality of panels of the first blank at a fold line, a plane having a longitudinal axis and a lateral axis is defined along the at least one bottom end flap of the first blank from the fold line to the free edge thereof, and the plurality of segments comprises a first longitudinal segment that intersects a first oblique segment, the first oblique segment extends to intersect a second oblique segment, the second oblique segment intersecting a third oblique segment, the third oblique segment intersecting a fourth oblique segment, the fourth oblique segment intersecting a lateral segment that extends to intersect a second longitudinal segment.

19. The sheet of claim 18, wherein the recess is defined proximate the lateral segment of the free edge of the at least one bottom end flap of the first blank.

20. The sheet of claim 19, wherein the protrusion is defined proximate the third oblique segment of the free edge of the at least one bottom end flap of the first blank.

21. The sheet of claim 20, wherein the at least one bottom end flap of the first blank is a first bottom end flap foldably connected to a respective panel of the plurality of panels of the first blank at a respective portion of the fold line, the plurality of end flaps of the first blank further comprises a second bottom end flap foldably connected to a respective panel of the plurality of panels of the first blank at a respective portion of the fold line, the second bottom end flap of the first blank has the longitudinal axis and the lateral axis, the second bottom end flap of the first blank is at least partially defined by a free edge that forms a recess and a protrusion extending into the recess of the second bottom end flap of the first blank, the free edge of the second bottom end flap comprises a plurality of segments, each segment of the plurality of segments of the second bottom end flap of the first blank intersecting a respective adjacent segment of the plurality of segments of the second bottom end flap of the first blank, the plurality of segments of the second bottom end flap comprises a first longitudinal segment that intersects a lateral segment that extends to intersect a first oblique segment, a second oblique segment that extends from the first oblique segment to intersect a third oblique segment, and a fourth oblique segment that extends from the third oblique segment to intersect a second longitudinal segment.

22. The sheet of claim 21, wherein the recess of the second bottom end flap of the first blank is defined proximate the second oblique segment of the free edge of the second bottom end flap of the first blank.

23. The sheet of claim 22, wherein the protrusion of the second bottom end flap of the first blank is defined proximate the lateral segment of the free edge of the second bottom end flap of the first blank.

24. The sheet of claim 23, wherein the free edge of the second bottom end flap of the first blank further comprises a curved segment extending from the second longitudinal segment to a fifth oblique segment.

25. The sheet of claim 21, wherein the at least one bottom end flap of the second blank is a second bottom end flap of the second blank, the plurality of end flaps of the second blank further comprises a first bottom end flap foldably connected to a respective panel of the plurality of panels, the first bottom end flap of the second blank at least partially defined by a free edge that forms a recess and a protrusion extending into the recess, the first blank and the second blank are arranged such that the protrusion of the first bottom end flap of the second blank is at least partially received in the recess of the second bottom end flap of the first blank, and such that the protrusion of the second bottom end flap of the first blank is at least partially received in the recess of the first bottom end flap of the second blank.

26. The sheet of claim 25, wherein the second blank is a mirror image of the first blank over each of the longitudinal axis and the lateral axis.

* * * * *